United States Patent
Budmiger

(10) Patent No.: US 7,340,963 B2
(45) Date of Patent: Mar. 11, 2008

(54) METHOD FOR MAGNETO-INDUCTIVE DETERMINATION OF THE FLOW RATE OF A MEDIUM

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/566,388

(22) PCT Filed: Jul. 16, 2004

(86) PCT No.: PCT/EP2004/007976

§ 371 (c)(1),
(2), (4) Date: Aug. 14, 2006

(87) PCT Pub. No.: WO2005/012842

PCT Pub. Date: Feb. 10, 2005

(65) Prior Publication Data

US 2007/0143041 A1   Jun. 21, 2007

(30) Foreign Application Priority Data

Jul. 30, 2003   (DE) ............... 103 35 205

(51) Int. Cl.
*G01F 1/58* (2006.01)
(52) U.S. Cl. .................................. 73/861.12
(58) Field of Classification Search ............ 73/861.17, 73/861.12, 861.16, 861.15
See application file for complete search history.

(56) References Cited

U.S. PATENT DOCUMENTS 4,409,846 A * 10/1983 Ueno ................. 73/861.17
4,545,257 A * 10/1985 Tomita ............... 73/861.17
4,676,112 A   6/1987 Uematsu et al.

FOREIGN PATENT DOCUMENTS

| DE | 102 43 748 A1 | 4/2003 |
|---|---|---|
| EP | 1 108 988 A1 | 6/2001 |
| GB | 2 348 011 A | 9/2000 |
| JP | 59122914 A | 7/1984 |
| JP | 01288724 A | 11/1989 |

\* cited by examiner

*Primary Examiner*—Jewel Thompson
(74) *Attorney, Agent, or Firm*—Bacon & Thomas, PLLC

(57) ABSTRACT

The invention relates to a magneto-inductive method for determining the flow rate of a medium flowing through a measuring tube in the direction of the measuring tube axis. In order to be able to detect a coating formation on a measuring electrode early and with a high degree of certainty, a test pulse ($U_p$) of defined pulse length ($t_p$) is issued to the measuring electrode; at least one signal in response to the test pulse ($U_p$) is determined at at least two measuring points in time ($t_1$, $t_2$), wherein the measuring points in time ($t_1$, $t_2$) lie in a time window ($t_{end}$-$t_{begin}$), which is so selected that no predictable disturbance signals occur on the measuring electrode in this time window ($t_{end}$-$t_{begin}$). On the basis of the response signal determined in the measuring points in time ($t_1$, $t_2$), the relaxation time, or the length of time until the reaching of a predetermined state of discharge ($U_i$), of the measuring electrode is determined; on the basis of the determined relaxation time, or on the basis of the length of time until the reaching of the defined state of discharge ($U_i$), of the measuring electrode, a malfunctioning of the measuring electrode (3,4) is detected, or becomes detectable.

12 Claims, 1 Drawing Sheet

METHOD FOR MAGNETO-INDUCTIVE DETERMINATION OF THE FLOW RATE OF A MEDIUM

FIELD OF THE INVENTION

The invention relates to a method for magneto-inductive determination of the flow rate of a medium flowing through a measuring tube in the direction of the measuring tube axis, wherein a magnetic field passes through the measuring tube essentially perpendicularly to the axis of the measuring tube, and a measurement voltage is induced in at least one measuring electrode arranged essentially perpendicularly to the axis of the measuring tube. The induced measurement voltage delivers information concerning the volume flow of the medium in the measuring tube. The invention relates to a corresponding apparatus.

BACKGROUND OF THE INVENTION

Magneto-inductive, flow-measuring devices use the principle of electrodynamic induction for volumetric flow measurement: Charge carriers of the medium moved perpendicularly to a magnetic field induce a voltage in measuring electrodes arranged likewise essentially perpendicularly to the flow direction of the medium. This voltage induced in the measuring electrodes is proportional to the flow velocity of the medium averaged over the cross section of the tube; it is, thus, proportional to the volume flow.

The measuring electrodes are coupled with the medium either galvanically or capacitively. If the measuring electrodes come in contact with the medium, then a coating forms on the surface of the measuring electrodes over the course of time. A result of this coating formation is a malfunctioning of the flow measuring device. If the coating is composed of a non-conducting material, then the flow measuring device no longer delivers any measured values at all.

Although, in what follows, coating formation on the measuring electrode will always be described as the cause of the malfunctioning, or non-functioning, of the flow measuring device, the invention is generally applicable also for the detection of other malfunctions, which can arise in the case of a magneto-inductive, flow-measuring device.

For removing undesired coatings of conductive material from the measuring electrodes, EP 0 337 292 proposes cleaning the measuring electrodes in predetermined intervals of time by application of an electric DC or AC voltage. In spite of the considerable advantages that an automatic cleaning of the measuring electrodes provides compared with a manually executed cleaning, the known automatic cleaning of the measuring electrodes also has disadvantages: First of all, it can not be universally applied for coatings of all materials—it functions only for removing conductive coatings. Moreover, the automatic cleaning is done as preventive maintenance in predetermined intervals of time; it is, thus, not assured that the cleaning will occur at a point in time when it is really needed.

Preventive cleaning of the measuring electrodes is, for a number of reasons, disturbing and undesired: Thus, for a certain period of time following the cleaning procedure, no volumetric flow measuring is possible, since the measurement voltage must first rise anew on the measuring electrodes. Furthermore, the electrical current supply for cleaning of the measuring electrodes occurs over a rigidly predetermined period of time, since the degree of the coating formation is largely unknown at the point in time of the cleaning. It is, thus, left to chance or to the related experience of the operating personnel, whether, following accomplishment of the automatic cleaning, the desired optimum state of the measuring electrodes has actually been reached. In the normal case, it can be assumed that, following automatic cleaning, either there is still coating on the measuring electrode, or the measuring electrode has been damaged because the cleaning voltage was applied for a longer period of time than necessary.

Still a greater problem are the interruptions of the measurements, when the measuring electrodes must be freed of non-conductive coatings as a part of preventive maintenance. The downtimes of the flow measuring device are yet greater in this case, since removal of non-conductive coatings can only be done by mechanical methods; i.e. the measuring device must be uninstalled and the measuring electrodes cleaned manually.

Known from EP 1 108 988 A1 is a solution concerning how a coating formation can be detected accurately and automatically, in order then, as required, for such to be removed from the measuring electrode. To this end, a defined test signal is sent to the measuring electrode; on the basis of the signal in response to the defined test signal and/or on the basis of a reference quantity determined from the signal in response to the defined test signal, it is determined whether the measuring electrode is delivering correct measured values. The signal in response to the defined test signal and/or the reference quantity determined from the signal in response to the defined test signal is referred to, in the following, for the sake of simplicity, as the actual value. By the method of the invention, a gradually approaching malfunctioning of the flow measuring device is detected early, so that it can then be opposed with targeted countermeasures. Especially, it is proposed in this Offenlegungsschrift to compare each actual value with a predetermined, desired value and to display, output and/or store an indication of malfunction, when the actual value deviates from the desired value.

The known solution provides the desired success in many respects. Measurement errors and erroneous interpretations can, however, arise, when the relaxation time of the signal in response to the test signal sent to the measuring electrode exceeds the duration of a measuring period. Due to the switching of the magnetic field after a measuring period, the situation can arise in which the control/evaluation unit signals a reaching of the desired value; yet, in fact, the supposed actual value is not an indication of the exceeding of a tolerable coating formation, but, instead, results from the superposition of different voltage values on the measuring electrode.

SUMMARY OF THE INVENTION

An object of the invention is to provide a method and an apparatus distinguished by reliable detection of coating formation in a magneto-inductive, flow-measuring device.

The object is achieved with reference to the method of the invention by the following combination of features: A test pulse of defined pulse length is issued to the measuring electrode; at least one signal in response to the test pulse is determined at at least two measuring points in time; the measuring points in time lie in a time window selected such that no predictable disturbance signals occur on the measuring electrode in this time window; the relaxation time, or the length of time until the reaching of a predetermined state of discharge, of the measuring electrode is determined on the basis of the response signal determined in the measuring points in time; and a malfunctioning of the measuring electrode is detected, or becomes detectable, as the case may be, on the basis of the determined relaxation time, or on the basis of the length of time until the reaching of a defined state of discharge, of the measuring electrode.

According to an advantageous further development of the method of the invention, it is provided that, in a beginning state, which is defined by the fact that no malfunction are occurring on the measuring electrode due to accretions, the relaxation time, or the length of time until the reaching of the defined state of discharge, of the measuring electrode is determined, and that such determined relaxation time, or length of time until the reaching of the defined state of discharge, of the measuring electrode is stored as the desired value.

An advantageous embodiment of the method of the invention provides that the test pulse is applied to the measuring electrode with a predetermined, or predeterminable, pulse length and/or with a predetermined, or predeterminable, pulse repetition frequency. Especially, it is provided, that the pulse length of the test pulse and/or the pulse repetition frequency of the test pulse is predetermined, or determined, as a function of the conditions at the location of measurement, especially as a function of the medium to be measured.

Additionally, an advantageous embodiment of the method of the invention provides that detection of whether the measuring electrode is working correctly, or whether a malfunctioning is present, is made on the basis of a time change of the relaxation time, or on the basis of a change of the length of time until the reaching of the defined state of discharge, of the measuring electrode.

In a form of embodiment of the method of the invention, it is provided, moreover, that a malfunctioning or an indication of a coming malfunctioning is displayed and/or issued, when the time change of the relaxation time, or the change of the length of time until the reaching of the defined state of discharge, of the measuring electrode lies outside of a tolerance range around the desired value, or when the relaxation time, or the length of time until the reaching of the defined state of discharge, of the electrode changes tendentially.

It has been found to be especially advantageous, when the time window is selected such that it lies after the point in time, at which the test pulse was applied to the measuring electrode to be tested, and that it lies before the point in time, at which the magnetic field is switched at the measuring electrode to be tested. Within this time window, it is assured that no changes of the potentials at the measuring electrodes are occurring due to a switching of the magnetic field of the magnetic field arrangement.

In connection with the method of the invention, it is additionally provided that, for the case in which the malfunctioning occurs as a result of the formation of a conductive coating on the measuring electrode, an automatic cleaning of the measuring electrode is activated, as soon as a malfunctioning is displayed and/or issued. For the case in which the malfunctioning occurs as a result of the formation of a conductive or a non-conductive coating on the measuring electrode, for example, a corresponding display and/or output occurs indicating that the measuring electrode needs to be cleaned. Especially, it is provided, that the automatic cleaning of the measuring electrode is done by means of the application of a direct or alternating current.

Concerning the apparatus of the invention, the object is achieved by the following combination of features: That the evaluation/control unit determines at least one signal in response to the test pulse at at least two measuring points in time, wherein the measuring points in time lie in a defined time window, wherein the time window is selected such that no predictable disturbance signals occur on the measuring electrode in this time window; and that the control/evaluation unit determines, on the basis of the response signal determined at the predetermined measuring points in time, the relaxation time, or the length of time until the reaching of a defined state of discharge, of the measuring electrode. Considered especially advantageous is the embodiment wherein the test pulse is a rectangular pulse of a determined and/or predetermined pulse length.

BRIEF DESCRIPTION OF THE DRAWINGS

The invention will now be explained in greater detail on the basis of the appended drawings, the figures of which show as follows.

DESCRIPTION OF THE PREFERRED EMBODIMENTS

Figure 1:
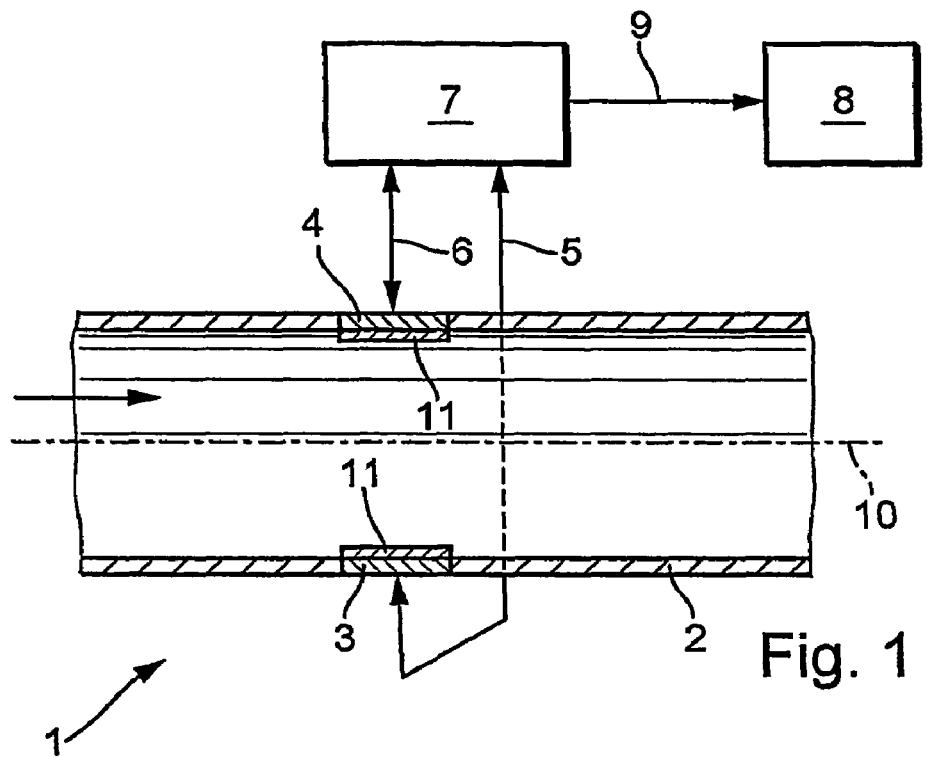
FIG. 1 a schematic illustration of an apparatus of the invention.

FIG. 1 shows a schematic illustration of an apparatus 1 of the invention. The measuring tube 2 of a flow measuring device contains medium flowing through it, in direction parallel to the measuring tube axis 10, as indicated schematically by the bold arrow on the left side of the tube. The medium is electrically conductive, at least to a small extent. The measuring tube 2 itself is made of a non-conductive material, or at least it is lined internally with a non-conductive material.

As a result of a magnetic field directed perpendicularly to the flow direction of the medium and usually produced by two diametrally opposed electromagnets (not shown), charge carriers in the medium migrate to the oppositely poled measuring electrodes 3; 4. The voltage arising between the two measuring electrodes 3, 4 is proportional to the flow velocity of the medium averaged over the cross section of the measuring tube 2, i.e. it is a measure for the volume flow of the medium in the measuring tube 2. In use, the measuring tube 2 is connected via connecting elements (not shown) with a pipe system, through which the medium is flowing.

In the illustrated case, the two measuring electrodes 3, 4 are in direct contact with the medium 2, whereby, over the course of time, coatings 11, 11 of particles of the medium form on the measuring electrodes 3, 4. This coating formation naturally influences the values of the induced voltage measured on the measuring electrodes 3, 4. If the coating is of a non-conductive material, then the flow measuring device no longer functions at all.

In order to maintain errors in the measuring of the volume flow within predetermined tolerance limits, it has, for a long time, been usual, to clean the measuring electrodes 3, 4 of the flow measuring device repeatedly after rigidly predetermined lengths of time. These empirically determined time spacings have some serious disadvantages, as already discussed above.

The measuring electrodes 3, 4 are connected by connecting lines 5, 6 with the control/evaluation unit 7. According to the invention, the control/evaluation unit 7 issues a test pulse $U_p$ to the measuring electrodes via the connection lines 5, 6. In the simplest case, the test pulse $U_p$ is a rectangular pulse. On the basis of a continuing observation of the relaxation behavior of the response signal, a coating formation in the process of building can be recognized on the measuring electrodes 3, 4. Such a coating formation can be acted against using the suitable measures already described above.

In the case of the solution known from EP 1 108 988 A1, relaxation time always means the time span until the signal in response to the test signal (e.g. the rectangular pulse $U_p$) has reached a predetermined threshold value $U_i$. As already mentioned, the disadvantage of this known method is considered to be that the end of the relaxation time can already lie in the following measuring period, in which the magnetic field, and, consequently, also the voltage on the measuring electrodes 3, 4, can have a reversed sign. As a result of this, the case can arise in which a coating formation lying outside of the tolerances is indicated, although the subceeding, or falling beneath, of a predetermined threshold value $U_i$ is here the result of a corresponding superimposing of negative and positive voltages on the measuring electrode 3, 4.

The desired value of the relaxation time is, moreover, determined as a function of the particular existing system and process conditions in the case of measuring electrodes 3, 4, which are as clean as possible. Because of the dependence of the relaxation time on the particular process and system conditions, it is very advantageous, when the 'coating formation detection' is calibrated in the process itself. This calibration is done e.g. by repeated application of test pulses (e.g. rectangular pulses $U_p$) of different lengths $t_p$, followed by determination of the relaxation time preferably according to the invention. The pulse length $t_p$ of the test pulse $U_p$ is changed for so long, until the relaxation time becomes located within a defined time window $t_{end}$-$t_{begin}$. According to the invention, this time window $t_{end}$-$t_{begin}$ is so selected, that no predictable disturbing signals occur there, such as can show up, for example, in the immediate vicinity of the point in time of the switching of the magnetic field. The determined pulse length $t_p$, in some cases the amplitude of the test signal $U_p$ and the associated relaxation time are stored as desired values.

For the purpose of performing the method of the invention, a test pulse $U_p$, especially a rectangular pulse of predetermined pulse length $t_p$, is issued to the measuring electrode 3, 4; then, a signal in response to the test pulse $U_p$ is determined at at least two measuring points in time $t_1$, $t_2$, wherein the measuring points in time $t_1$, $t_2$ lie in a time window $t_{end}$-$t_{begin}$ so selected that, as already mentioned often above, in this time window $t_{end}$-$t_{begin}$, no predictable interference signals occur on the measuring electrode 3, 4.

Disturbing signals are, especially, brought about by the switching of the magnetic field. Especially, the time window $t_{end}$-$t_{begin}$ is so selected, that it lies between the reaching of the linear region of the registration of the voltage U on the measuring electrodes 3, 4 and the measuring point in time $t_{end}$ at the end of the measuring period. For determining the relaxation time, it is necessary to know two voltage values $U_1$, $U_2$ on the measuring electrode 3, 4. One can be, for example, identical with the test pulse $U_p$, while the second is obtained by measuring at a later measuring point in time $t_2$, which lies within the time window $t_{end}$-$t_{begin}$. On the basis of the known and/or determined voltage values at different measuring points in time $t_1$, $t_2$, the relaxation time, or the length of time until the reaching of a predetermined state of discharge $U_i$, of the measuring electrodes 3, 4 is determined; on the basis of the determined relaxation time, or on the basis of the length of time until the reaching of the defined state of discharge $U_i$ of the measuring electrode 3, 4, a malfunctioning of the measuring electrode 3, 4, such as can be brought about especially by a coating formation, is detected, or becomes detectable, as the case may be.

Figure 2:
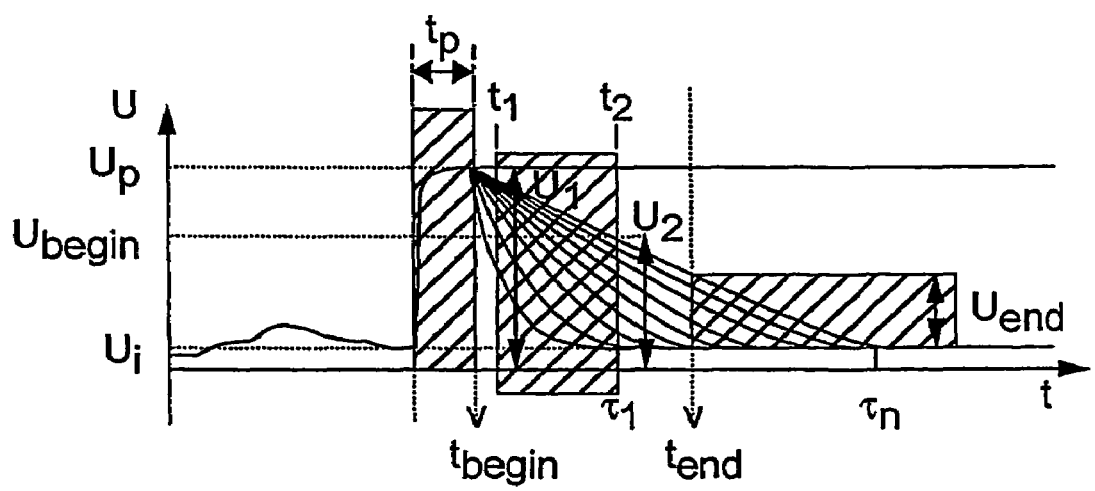
FIG. 2 an illustration of the relaxation behavior of the electrode potentials on the measuring electrodes at different coating formations.

For the case in which the two measuring points in time $t_1$, $t_2$ are any measuring points in time lying within the time window $t_{end}$-$t_{begin}$, the relaxation time can be calculated by the following formula, with reference being made to FIG. 2 for explanation of the nomenclature:

$$\tau \approx \frac{\ln\left(\frac{U_2 - U_i}{U_P}\right) - \ln\left(\frac{U_1 - U_i}{U_P}\right)}{t_2 - t_1}$$

If the edges of the time window $t_{end}$-$t_{begin}$ as the measuring points in time $t_{begin}$, $t_{end}$, then the formula becomes:

$$\tau \approx \frac{\ln\left(\frac{U_{END} - U_i}{U_P}\right) - \ln\left(\frac{U_{BEGIN} - U_i}{U_P}\right)}{t_{END} - t_{BEGIN}}$$

If it happens in subsequent periodical measurings for the purpose of coating formation detection that the calculated actual value of the relaxation time for the defined test pulse lies outside of certain tolerance limits about the desired value of the relaxation time, then a malfunction is displayed on the display unit 8 of the flow measuring device; alternatively, in the case of formation of conductive coatings 11, an automatic cleaning process can be activated.

According to the invention, the cleaning of the measuring electrodes 3, 4, or the display, that a cleaning of the measuring electrodes 3, 4 is needed, can always occur, when the coating formation arising on the measuring electrodes 3, 4 is sufficiently strong that it leads to unacceptable corruption of the values measured on the measuring electrodes 3, 4. In this way, it is possible to optimize the length of time between two cleaning procedures: Thus, on the one hand, the cleaning is done, before the flow measuring device delivers erroneous measured values, or, in the case of non-conductive coatings 11, before no measured values can be delivered at all; on the other hand, the cleaning is done only when it is actually required, and not as a matter of preventive maintenance at certain intervals of time, which are determined on the basis of empirical experience.

FIG. 2 is an illustration of the relaxation behavior of the electrode potentials on the measuring electrodes 3, 4 in the case of differing degrees of coating formation. A rectangular pulse $U_p$ of defined length in time $t_p$ is issued to the measuring electrodes 3; 4. The control/evaluation unit 7 calculates the relaxation time on the basis of voltage values measured at two different measuring points in time $t_1$, $t_2$. These measuring points in time $t_1$, $t_2$ lie within a defined time window $t_{end}$-$t_{begin}$.

The invention claimed is:

1. A method for magneto-inductive determination of flow rate of a medium flowing through a measuring tube in the direction of the measuring tube axis, wherein a magnetic field passes through the measuring tube essentially perpendicularly to the measuring tube axis, a measurement voltage is induced in at least one measuring electrode arranged essentially perpendicularly to the axis of the measuring tube, and the induced measurement voltage delivers information concerning the volume flow of the medium in the measuring tube, the method comprising the steps of:

issuing a test pulse ($U_p$) of a defined pulse length ($t_p$) to the measuring electrode;

determining at least one signal in response to the test pulse ($U_p$) at at least two measuring points in time ($t_i$, $t_2$);

selecting the measuring points in time ($t_1$, $t_2$) to lie in a time window ($t_{end}$-$t_{begin}$), which is such that no predictable disturbance signals occur on the measuring electrode in said time window ($t_{end}$-$t_{begin}$);

determining the relaxation time (T), or the length of time until reaching of a predetermined state of discharge ($U_i$), of the measuring electrode on the basis of the response signal determined in the measuring points in time ($t_1$,$t_2$); and detecting a malfunctioning of the measuring electrode on the basis of the determined relaxation time, or on the basis of the length of time until the reaching of the defined state of discharge ($U_i$), of the measuring electrode.

2. The method as claimed in claim 1, wherein:

said relaxation time, or the length of time until reaching of the defined state of discharge ($U_i$), of the measuring electrode is determined in a starting state, which is defined on the basis that there is no malfunction present on the measuring electrode due to accretions, and the determined relaxation time (T), or the length of time until reaching of the defined state of discharge ($U_i$), of the measuring electrode is stored as a desired value.

3. The method as claimed in claim 1, wherein:

the test pulse ($U_p$) is applied to the measuring electrode with a predetermined, or predeterminable, pulse length ($t_p$) and/or with a predetermined, or predeterminable, pulse repetition frequency.

4. The method as claimed in claim 3, wherein;

the pulse length ($t_p$) of the test pulse ($U_p$) and/or the pulse repetition frequency of the test pulses is predetermined, or determined, as a function of conditions at the measuring location, especially as a function of the medium to be measured.

5. The method as claimed in claim 1, further comprising the step of:

determining whether the measuring electrode is working correctly, or whether a malfunctioning of the measuring electrode is present, on the basis of a time change of the relaxation time, or on the basis of the length of time until reaching of the defined state of discharge ($U_i$), of the measuring electrode.

6. The method as claimed in claim 2, further comprising the step of:

displaying and/or issuing a malfunctioning or an indication of a coming malfunctioning, when the time change of the relaxation time, or the change of the length of time until the reaching of the defined state of discharge ($U_i$), of the measuring electrode lies outside of a tolerance range around the desired value or when the relaxation time, or the length of time until the reaching of the defined state of discharge ($U_i$), of the measuring electrode changes tendentially.

7. The method as claimed in claim 1, wherein:

said time window ($t_{end}$-$t_{begin}$) is so selected that it lies after the point in time at which the test pulse ($U_p$) was applied to the measuring electrode to be examined and that it lies before the point in time at which the magnetic field on the measuring electrode to be examined is switched.

8. The method as claimed in claim 1, wherein:

for the case in which the malfunctioning occurs as a result of the formation of a conductive coating on the measuring electrode, an automatic cleaning of the measuring electrode is activated, as soon as an indication of malfunction is displayed and/or issued.

9. The method as claimed in claim 1, wherein:

for the case in which the malfunctioning occurs as a result of the formation of a conductive or non-conductive coating on the measuring electrode, a display and/or an output occurs, indicating that the measuring electrode needs to be cleaned.

10. The method as claimed in claim 8, wherein:

the automatic cleaning of the measuring electrode is done by means of a direct or alternating current.

11. An apparatus for measuring flow of a medium flowing through a measuring tube in the direction of the measuring tube axis, comprising:

a magnet arrangement, which produces a magnetic field passing through the measuring tube and extending essentially transversely to the measuring tube axis;

a measuring electrode arrangement, which delivers a measured value depending on the flow velocity of the medium through the measuring tube; and a control/evaluation unit, which determines the flow rate of the medium in the measuring tube on the basis of the measured value; wherein:

said control/evaluation unit determines at least one signal in response to the test pulse ($U_p$) at at least two measuring points in time ($t_1$, $t_2$) lying in a defined time window ($t_{end}$-$t_{begin}$), said time window ($t_{end}$-$t_{begin}$) is selected such that no predictable disturbance signals occur on the measuring electrode in this time window ($t_{end}$-$t_{begin}$); and said control/evaluation unit determines the relaxation time, or the length of time until reaching of a defined state of discharge ($U_i$), of said measuring electrode on the basis of the response signal measured at the predetermined measuring points in time ($t_i$, $t_i$).

12. Apparatus as claimed in claim 11, wherein:

the test pulse is a rectangular pulse ($U_p$).

* * * * *